July 14, 1959
J. W. HEYD
2,895,047
TIMING CIRCUIT
Filed Dec. 21, 1954
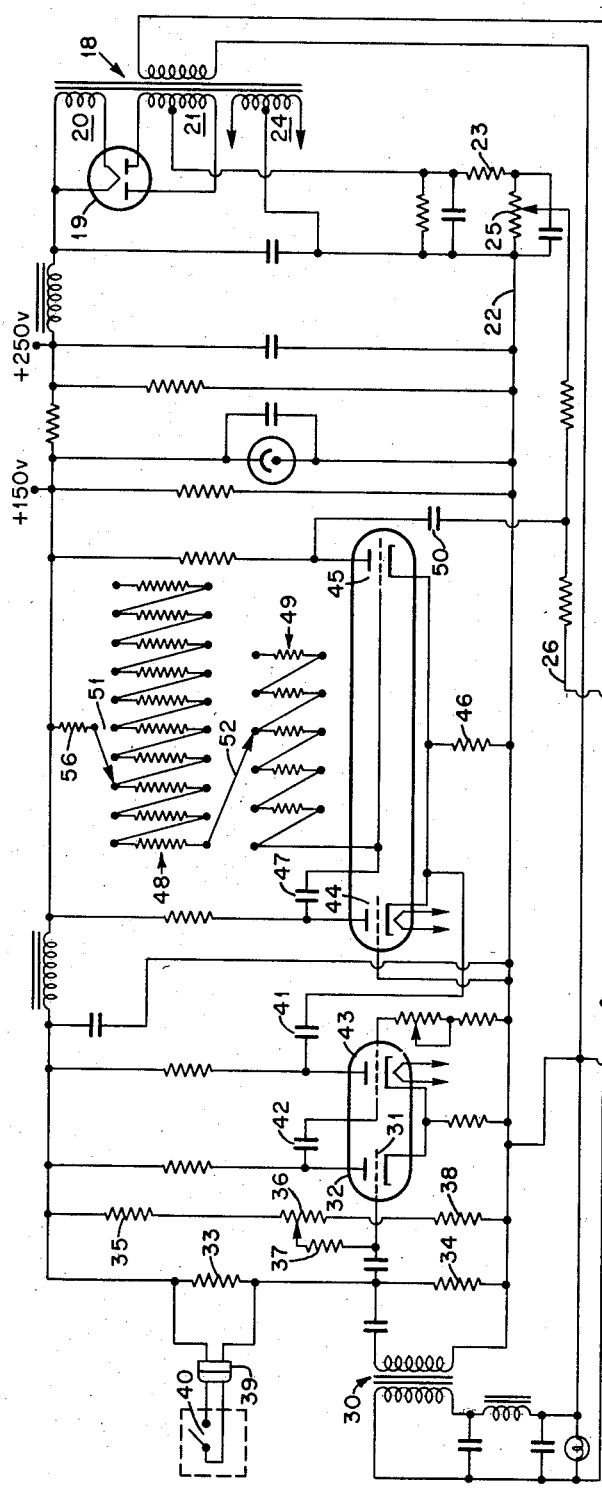
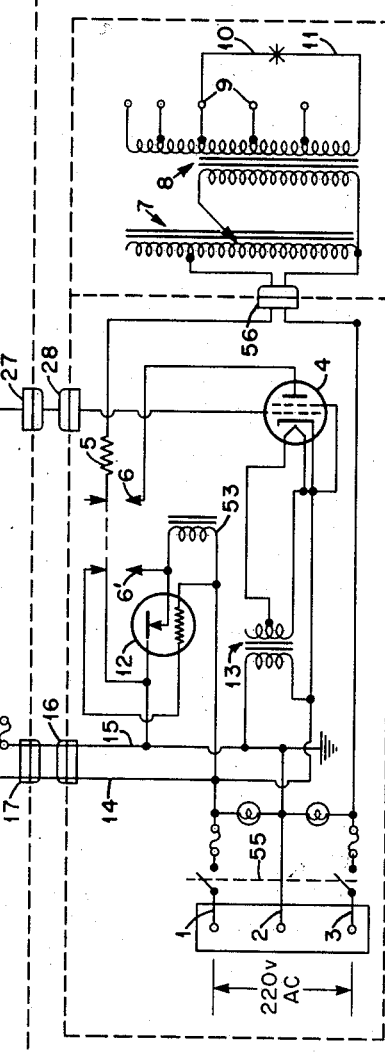
INVENTOR.
BY   Josef W. Heyd
*Roland A. Anderson*
ATTORNEY

United States Patent Office

2,895,047
Patented July 14, 1959

2,895,047

TIMING CIRCUIT

Josef W. Heyd, Dayton, Ohio, assignor to the United States of America as represented by the United States Atomic Energy Commission Application December 21, 1954, Serial No. 476,863

2 Claims. (Cl. 250—27)

The present invention relates to electronic timing circuits, and more especially to means for controlling with extreme accuracy the duration of alternating current flow to a load, such as in the welding cycle of a spot welder, together with means for controlling the magnitude of the current flowing during that cycle.

When a great many identical welds are to be made, it may be desirable that all the welds be uniform in strength. To achieve uniform strength, the duration of the welding cycle and the magnitude of the welding current must be reproducible from weld to weld within extremely close tolerances. In conventional thyratron-controlled spot welders, the thyratron acts as a switch allowing pulsating current to flow through the welding transformer and the welding circuit during each positive half-cycle of its plate voltage, the thyratron being energized directly off the A.C. power line to avoid the expense associated with a separate D.C. power supply. For low power, extremely short welding cycles, such as may be required in making welds on very thin materials, the total current flowing across the welding arc may be extremely critical. The normal method of controlling the amount of current flowing has been by having an operator close a switch to begin the welding cycle, observe a clock to ascertain passage of certain duration of time, and open a switch at the end of the selected time to break the welding arc.

It is at once apparent that such prior methods introduced many inaccuracies. First, the starting switch may be closed at any time, not related to the power cycle of the welding arc, so that the starting instant may occur at any point on the thyratron power cycle. Second, human error is introduced by requiring the operator to observe an external timing device and throw a switch to break the arc after the elapse of a selected time. Third, the external timing device may also introduce a small error, since it usually is not synchronized with the welding power current.

With a knowledge of the inaccuracies introduced by prior timing methods and devices, applicant has as a primary object of his invention provision of means for controlling within extremely close limits the amount of electrical current flowing across a load, such as two welding electrodes.

Another major object of his invention is to provide means for controlling both the duration of the welding arc and the magnitude of the welding current so as to produce uniformly strong welds.

Another object of his invention is to provide means for supplying single pulses of known time duration to a thyratron-controlled spot welder to control the duration of the welding cycle.

These and other objects of applicant's invention will become apparent from the following detailed description of a preferred embodiment thereof, when read in connection with the appended drawing, which illustrates a circuit diagram of a preferred embodiment of the invention.

In accordance with the present invention, the duration of the current flow through a load is accurately controlled by supplying to a switch, such as a thyratron in the load or utilization circuit, a selected number of single pulses of known duration, and the magnitude of the current flowing per cycle is determined by setting certain movable contacts of transformers in circuit with the switch, or thyratron. The number of pulses applied to the switch may be determined by a timing circuit, such as a single-shot multivibrator, coupled to actuate the switch. The instant of triggering of the timing circuit is synchronized with the welding current frequency by deriving a portion of the switch-energizing voltage and load current from a common power supply and supplying said part to the input of the timing circuit together with a D.C. bias signal. For example, a control switch may be arranged to deliver, when actuated, a selected D.C. bias signal to the input grid of the multivibrator but the bias is insufficient to trigger the multivibrator by itself alone. When the negative peak of the 60 cycle A.C. voltage derived from the welding power supply is superimposed upon the D.C. bias from the control switch, however, triggering will occur. Thus, the welding cycle will begin at the point in the A.C. welding cycle where the sum of the D.C. bias voltage and the A.C. voltage is sufficient to trigger the multivibrator, and this point is always substantially the same, regardless of the time during the power cycle when the control switch is actuated. Means are also provided in the timing circuit, for example in the coupling circuit of the multivibrator, to determine the length of time before the circuit returns to its initial state, in order to determine exactly the length of time which the thyratron grid will be maintained in the conducting region.

Referring now to the attached drawing, a preferred embodiment of the invention arranged to operate on 220 volt A.C. power, such as is generally available, is illustrated. 220 volt, single phase, 60 cycle, A.C. power may be provided on leads 1, 2, 3, with line 2 being grounded. Line 1 is coupled to the cathode of thyratron 4, and line 3 is coupled through resistor 5 and relay contact 6 to the plate of the thyratron. Also in circuit with the thyratron plate and lead 3 is an autotransformer 7. Welding transformer 8 has its primary coupled to the autotransformer and its secondary coupled to the welding electrodes through the taps 9 and leads 10, 11. Time delay relay 12 is connected across leads 1, 2 and is provided with contacts 6, 6′ which complete a circuit to energize the thyratron only after a selected time delay, to allow for proper warmup. Filament power for the thyratron is provided through filament transformer 13, energized across leads 1, 2.

110 volts A.C. is supplied to the timer unit through leads 14, 15 and plugs 16, 17, and is delivered to the primary of power transformer 18. Full wave rectifier 19 is provided with a cathode connected across winding 20 and a pair of anodes connected to opposite ends of winding 21, the center tap of which is returned to common lead 22 through resistors 23, 25. Winding 24 is center tapped, and the tap is connected to common lead 22. Potentiometer 25 is connected between resistor 23 and lead 22 and is provided with a movable arm connected through resistors to lead 26 and through plugs 27, 28 to the grid of thyratron 4, to provide a negative bias voltage therefor.

The 110 volt A.C. voltage from leads 14, 15 is also supplied to the primary circuit of transformer 30, the secondary of which is coupled to the input grid 31 of tube 32. D.C. bias for the grid 31 is determined by the divider network including resistors 33, 34 and the network including resistors 35, 36, 37, 38. Control switch 40 is connected across opposite ends of resistor 33 through plug 39, and when closed will short out resistor 33.

Tubes 32, 43 are cathode coupled, and the capacitor 42 is coupled between the plate of tube 32 and the grid of tube 43 in a conventional trigger circuit arrangement.

The plate of tube 43 is coupled through condenser 41 to the cathode of a single-shot multivibrator comprising tubes 44, 45. These tubes have a common cathode resistor 46 and a coupling capacitor 47, and are provided with a timing resistor network 56, 48, 49 between the +150 volts B+ lead and the grid of tube 45. The network includes specially selected resistors connected in a series, or alternatively a pair of potentiometers, including first and second sections 48, 49. Output from the multivibrator is taken through condenser 50 to lead 26 and thence the control grid of thyratron 4.

Switches 51, 52 are adjustable to select the value of resistance desired to be inserted in the timing circuit of the multivibrator. Preferably, the settings of the switches are numbered, with switch 51 having positions from 1 to 10 and switch 52 having positions from 0 to 50. With properly selected resistors, the length of the welding pulse in cycles of the 60 cycle power frequency will be equal to the sum of the setting on both switches. The resistors in section 48 are all preferably 220,000 ohms, while the resistors in section 49 are preferably 2.2 megohms each.

In operation, power switch 55 is closed, energizing the circuits of both the thyratron unit and the timer unit. The taps on the transformer 8 and the autotransformer 7 are adjusted for the desired magnitude of the welding current. The duration selected for the weld is adjusted by means of switches 51, 52. After a suitable warm-up time delay, relay 12 actuates relay 53 which is connected thereto and provided with contacts 6, 6'. Closing of these contacts furnishes 220 volt A.C. to the plate of thyratron 4. A negative bias is provided at the grid of the thyratron through lead 26 through transformer 18, potentiometer 25, and lead 26.

When a weld is to be made, switch 40 is opened, removing the short circuit around resistor 33, inserting resistor 33 in series with resistor 34, and causing a negative transient to be coupled to the input grid 31 of tube 32. A 60 cycle A.C. voltage is applied between the grid and cathode of tube 32 through the transformer 30, the primary of which is coupled to the 110 volt A.C. leads 14, 15. At the negative peak of the A.C. voltage sinusoid, the negative voltage impressed upon grid 31 will be just sufficient to trigger the tube, cutting off tube 32 and allowing tube 43 to conduct. A negative pulse is thus produced at the plate of tube 43 and is coupled through condenser 41 to the cathode of tubes 44, 45. The control grid of tube 44 is coupled to the common return lead 22 to provide a negative grid bias, so that tube 44 is normally non-conducting. But when the negative pulse is received at the tube cathode, tube 44 begins to conduct, causing a voltage drop at its plate, which drop is coupled across condenser 47 to tube 45. Tube 45 is driven toward cut-off, producing a positive pulse at its plate, which pulse is coupled through condenser 50 and lead 26 to the control grid of thyratron 4, raising it above the breakdown voltage and allowing the thyratron to conduct.

While the positive enabling voltage pulse is impressed upon the thyratron grid, the thyratron will pass current during each half-cycle that its plate is also positive. When the thyratron plate goes positive, current will flow through lead 1, to the cathode of tube 4, through the tube, through contact 6, resistor 5, plug 56, and the primary of transformer 7, and will return through the plug 56 to lead 3. From the autotransformer, a voltage is induced in the primary of welding transformer 8, thus energizing the secondary of the transformer and providing a current through leads 10, 11 to energize the welding arc. The thyratron conducts only when its plate is positive, so that the welding transformer receives power only on alternate half-cycles of the power cycle.

While the multivibrator is thus triggered to its unstable state, the grid voltage of tube 45 begins to rise, at a rate determined by the timing network including condenser 47 and resistors 48, 49, 56. After a time determined by the magnitude of the resistors selected, tube 45 will again begin to conduct, causing a voltage drop across condenser 50 which is coupled to the thyratron grid to prevent conduction therethrough on the next half-cycle when the plate goes positive.

Since the instant of triggering of the multivibrator is determined by the alternating current synchronized with the welding current, and derived from a common source, it may be seen that the welding current will always start to flow at substantially the same point in the welding power cycle, irrespective of at what time during that cycle the control switch 40 is operated. Duration of the welding cycle is selected by the period of the multivibrator, and can be controlled within one cycle, or one sixtieth of a second. Since the beginning of the cycle occurs at the negative peak, it is apparent that the welding cycle may be controlled within one half cycle, or one one-hundred twentieth of a second, thus allowing very accurate and reproducible control of even extremely short welding cycles.

It will be apparent to those skilled in the art that the timing means and methods illustrated with reference to a welding device are applicable to a great many other situations where precise regulation of the amount of current delivered to a utilization device is required. The foregoing example of a welding circuit controlled by the timing device is to be construed as illustrative only, and not in a limiting sense, the scope of the invention being particularly pointed out in the appended claims.

What is claimed as novel is:

1. Means for controlling the A.C. power delivered to a utilization device comprising a source of alternating current; a grid-controlled gas discharge device connected in series circuit between said source and said device; means for supplying a negative bias voltage to said discharge tube to prevent conduction therethrough; a mono-stable switching circuit having an input coupled to receive actuating pulses, an output coupled to said grid to deliver a positive control signal thereto, and provided with a timing network adjustable to control the time required by said circuit to reassume its stable state after actuation; a trigger circuit having an output coupled to the input of said mono-stable circuit and an input connected to receive a control pulse; a source of bias voltage in said input of said trigger circuit; a control switch; means coupling said switch in circuit with said trigger input such that actuation of said switch provides substantially but not all of the triggering voltage required at said trigger input; and means coupling a portion of the alternating current from said course of alternating current to said trigger input, said portion being sufficient in magnitude to actuate said trigger circuit upon actuation of said switch only at the peak amplitude of the voltage alternation cycle.

2. The device of claim 1 wherein: said trigger circuit includes a first discharge device having a grid, cathode, and anode; said source of bias voltage includes a source of undirectional voltage, a first voltage divider network directly connected to said grid and cathode to maintain said discharge device normally conducting, and a second divider network comprising first and second resistors connected in series across said unidirectional source, said grid being capacitively coupled and said cathode being directly coupled to opposite ends of said first resistor; and said control switch is connected normally closed across said second resistor to drive said grid more negative when opened.

References Cited in the file of this patent

UNITED STATES PATENTS

| | | |
|---|---|---|
| 1,985,069 | Anschutz | Dec. 18, 1934 |
| 2,003,992 | Cockrell | June 4, 1935 |
| 2,402,916 | Schroeder | June 25, 1946 |
| 2,590,783 | Mayer | Mar. 25, 1952 |
| 2,679,598 | Wright et al. | May 25, 1954 |
| 2,805,393 | McCoy | Sept. 3, 1957 |

UNITED STATES PATENT OFFICE

CERTIFICATE OF CORRECTION

Patent No. 2,895,047                                July 14, 1959

Josef W. Heyd

It is hereby certified that error appears in the printed specification of the above numbered patent requiring correction and that the said Letters Patent should read as corrected below.

Column 4, line 49, for "course" read -- source --.

Signed and sealed this 19th day of January 1960.

(SEAL)
Attest:

KARL H. AXLINE
Attesting Officer

ROBERT C. WATSON
Commissioner of Patents